Patented Sept. 15, 1942

2,295,673

UNITED STATES PATENT OFFICE 2,295,673

DEALKYLATION USING NICKEL SULPHIDE CATALYST

Virgil E. Meharg, Bloomfield, N. J., and Kenneth W. Coons, Tuscaloosa, Ala., assignors to Bakelite Corporation, a corporation of New Jersey No Drawing. Original application September 14, 1937, Serial No. 163,798. Divided and this application January 28, 1942, Serial No. 428,624

3 Claims. (Cl. 260—621)

This invention relates generally to processes for treating crude tar fractions containing phenolic bodies to obtain therefrom relatively pure mixtures of low boiling phenols and more especially improvements in processes which comprise of catalytically treating the unpurified coal tar mixture. In one aspect the invention involves the production of lower boiling phenols from tar mixtures containing higher boiling phenols.

Heretofore in processes of this nature it has been suggested to pass the crude material over a heated catalyst consisting of nickel. This catalyst is disadvantageous in that when operated under conditions giving a reasonably high conversion ratio, it is not selective and consequently the mixture obtained therefrom contains many undesirable by-products which limit its use; moreover nickel is readily poisoned by materials commonly found in crude phenolic mixtures, such as the various derivatives and compounds of pyridine, pyrrole, benzo-nitrile, thionitriles, isonitriles, and isothionitriles, mercaptans, thiazoles and the like, which materials although present in almost negligible quantities in most ordinary mixtures of crude phenolic materials readily destroy expensive catalysts.

The present invention, which will be described with relation to reactions in which the higher phenolic bodies are dealkylated in conjunction with hydrogen (such as the conversion of xylenol to cresol, cresol to phenol, etc.), contemplates the use of catalyst masses effective at atmospheric pressure and characterized by superior ruggedness and greater resistance toward poisons than the catalysts heretofore employed. Among the materials found by the present inventors to be suitable for this purpose are compounds of the metals which are precipitated by a sulphur-containing reactant in qualitative analysis, particularly those precipitated by ammonium sulphide, and the metals which stand close to these metals in the periodic classification of the elements. In general, these metals extend from nickel up through aluminum in the electromotive series. For practical purposes compounds of aluminum, iron, zinc, and nickel are preferred because of their low cost. The silicates, sulphides and oxides of aluminum, iron and zinc are very effective but there appears to be a decided difference in effectiveness between nickel sulphide and nickel oxide; nickel sulphide being quite effective while nickel oxide is not so effective. The cadmium compounds are quite effective as are the barium compounds, barium standing next to cadmium in the periodic table. These substances, hereinafter designated as dealkylation catalysts in accordance with the terminology preferred by the inventors, function as catalysts for the removal of alkyl groups attached to the aryl nucleus of the phenolic body; thus by treating a trimethyl phenol, a dimethyl phenol is obtained, when the reaction temperatures are less than 600° C. Another characteristic of these catalysts, prepared according to the present invention, is that they prevent or at least inhibit the formation of relatively large quantities of undesirable by-products such as xylene, toluene, benzene and the like (so-called neutral oil) which have been found in mixtures obtained with catalysts heretofore known, thus minimizing "cracking" (formation of gaseous unsaturated hydrocarbons), and condensation (formation of tars and resins by reaction of the various constituents of the mixture with each other). Moreover, the catalysts prepared according to the present invention are characterized by extremely long life under ordinary industrial conditions and show but little diminution in activity even after prolonged usage. Furthermore, the catalysts are easily rejuvenated by briefly heating at elevated temperatures; after such treatment their activity is comparable to that of a new or freshly-prepared mass.

To obtain catalysts having the above properties it has been found desirable to precipitate the oxides or sulphides of the metals from rapidly agitated dilute solutions of their metal salts, preferably the chlorides, nitrates or sulphates, with an appropriate oxide, or sulphide at temperatures not exceeding 60° C. and preferably at temperatures below 30° C. The silicates are preferably prepared in the form of gels, i. e. solutions of the metal salts are added to solutions of alkaline silicates at temperatures preferably below 30° C. The resulting metal silicate gels when dehydrated and used at the proper temperature are particularly effective catalysts, more especially in suppressing the formation of high boiling tar residues.

Catalysts so prepared are distinguished by their small particle size, since the precipitated oxides or sulphides or silicate gels are for the most part substantially colloidal in nature. They are also characterized by their low specific volume which in most cases does not exceed one, and their gel-like structure.

Prior to their use, it has been found desirable to activate the catalysts prepared as above described, by heating them in an atmosphere of hydrogen at a temperature of 350° C. or higher.

In general it may be said that the activation temperature should be a minimum of about 50° C. above the initial dealkylation temperature, it having been found that catalysts activated at temperatures lower than this have only a short active life, while the catalysts activated at the higher temperatures have a high degree of catalytic activity and a long life, say about 5 to 10 times greater than the life of catalysts activated at temperatures below 350° C. or below the 50° C. minimum stated above.

It has also been found that dealkylation of tar acids occurs most advantageously when the volume of hydrogen bears a certain relationship to the volume of tar acid used in the reaction chamber. Specifically, about four volumes of hydrogen to one volume of tar acids have been found to give the most satisfactory results.

It has been further found that the temperature at which dealkylation is most effective bears an inverse ratio to the boiling point of the tar acids, i. e. tar acids having a high boiling point are dealkylated at lower temperatures than the lower boiling tar acids and its is a further object of this invention to increase the efficiency of the dealkylation process by coordinating the tar acid fraction and the temperature of dealkylation. Thus, it has been found that the dealkylation temperature in general should not exceed 650° C. and is advisedly kept as low as 500° C. for the higher boiling tar acid fractions in order to obtain an equivalent conversion to lower boiling phenolic materials. In order, therefore, not to subject the higher boiling fractions to the extremes of temperature desirable in dealkylating the lower boiling fractions, we have found it preferable to first fractionate the crude tar acids and selectively dealkylate each fraction at the most favorable dealkylation temperature. Thus, for a tar acid fraction containing mostly cresols and boiling between 195° and 205° C. the maximum temperature was about 650° C. for the most efficient dealkylation, whereas a fraction boiling between 218–222° C. and containing mostly xylenols, was more effectively dealkylated at a maximum of about 600° C. and a fraction boiling at 240–250° C. containing mostly trimethyl phenol was readily dealkylated at 550° C. while higher temperatures increased the amount of hydrocarbons and tarry residues.

In order further to illustrate the subject matter of the invention but without intending to limit the scope of the invention, reference may be had to the following examples.

Example 1.—A catalyst is prepared substantially as follows: A dilute aqueous solution (3%) of ferric chloride is slowly added to a rapidly agitated aqueous solution of ammonium hydroxide (2%) in such proportion that an excess of ammonium hydroxide remains after the ferric hydroxide is precipitated and at a temperature of about 30° C. The ferric hydroxide is precipitated as a finely divided gelatinous mass which is washed with water several times by decantation. It is then filtered on a suction filter and the wet filter cake repeatedly washed until tests indicate the absence of chloride ions. The filter cake is then dried by suction until a hard dry cake is obtained which is then further dried at 98° C. for about 12 hours. The precipitated and dried material is then granulated and screened to about 4–10 mesh and charged into a silica tube and slowly heated to 350° C. in a slow stream of hydrogen, after which it is ready for use. The catalyst so formed is characterized by an extremely small particle size, probably falling within the colloidal range and possesses an average specific volume of about 0.8.

Example 2.—A catalyst is prepared substantially as follows: 100 parts of hydrated ferric chloride dissolved in 350 parts of water are mixed with 80 parts of an aqueous solution of hydrogen chloride (about 37% by weight) and this mixture is added under rapid agitation to 200 parts of sodium ortho-silicate (40° Bé.), at a temperature preferably below 30° C. After the various reactions have taken place the resulting gel is formed in about 5 hours forming a composite of ferric silicate and silica gel. The gel is removed from the supernatant liquid, divided, dried in air (about 90% humidity preferred for slow drying) at approximately 20° C. for 5 to 7 days, and then washed with ice water. The mass is then leached with 800 parts of water containing a small quantity of glacial acetic acid (for example, about 20 parts) for approximately one-half hour, and then washed with water until tests indicate the absence of acetate ions. The low temperature and the acid produce a catalyst which is stronger and more active than if these conditions were not observed.

After being dried (preferably at about 60° C.) and heated in an atmosphere of hydrogen at 350° C., the catalyst is ready for use. A catalyst of diminished activity but increased mechanical strength and stability is obtained when gelation is carried out at approximately 60° C.

Example 3.—A catalyst is prepared substantially as follows: About 263 parts of nickel sulphate hexahydrate dissolved in a suitable quantity of water (for instance about 3000 parts), are treated with an agent such as hydrogen sulphide to cause formation of a very finely divided precipitate of nickel sulphide. After washing the precipitate to substantially remove the soluble impurities therefrom, it is dried at about 100° C. for 12 hours, and when activated and suitably supported, is ready for use.

Example 4.—A catalyst is prepared substantially as follows: About 192 parts of cadmium nitrate tetrahydrate dissolved in 3000 parts of water are mixed under agitation with about 50 parts of sodium hydroxide dissolved in 1000 parts of water; the somewhat gelatinous precipitate of cadmium hydroxide so obtained is washed, dried and activated as in the preceding example and is then ready for use.

Example 5.—A catalyst is prepared substantially as follows: About 198 parts of zinc nitrate hexahydrate are dissolved in about 3000 parts of water and mixed at about 30° C. and under vigorous agitation with approximately 53 parts of sodium hydroxide dissolved in about 1000 parts of water; the precipitated zinc hydroxide is washed until substantially free of soluble impurities and dried at about 90° C. for 12–15 hours, after which it is ready for use. The catalyst is activated by treatment with hydrogen as in Example 1.

Illustrative of the manner in which the catalysts prepared according to the present invention, may be utilized in hydrogenation processes, a typical scheme of treatment is as follows:

A train is set up comprising a tar acid vaporizer, a mixing chamber, a preheater, a catalyst chamber, and receiver. The tar acid vaporizer is charged with 1016 parts of a xylenol fraction, the major portion of which boils between 218–222° C. and consists mainly of 3:5- and 2:3-dimethyl phenol with substantially no phenol or cresol.

The catalyst chamber (about ¾ inch in diameter containing about 5 inches of catalyst) is charged with the catalyst prepared as in Example 1 and the apparatus washed with hydrogen while the preheater is at a temperature of 500° C., after which it is allowed to cool to a temperature of the order of 300° C. before any coal tar acids are admitted. The tar acid vaporizer is now heated and the vapors passed into the mixing chamber where they are mixed with hydrogen in the ratio of 1 part by volume of tar acid vapors to 4½ parts of hydrogen. This mixture is then passed over the catalyst which is brought to a temperature of 400° C. and then gradually increased to 600° C., during the course of the run which is continued until 890 parts of material collect in the receiver. The average time during which any portion of the vaporized material is in contact with the catalyst is about 3.6 seconds. Analysis after a typical run indicated that even with the small amount of catalyst used, and a single passage through the catalyst, 64% of this distillate now contained about 90% phenolic constituents, mainly phenols and cresols, the remaining 10% consisting of water, benzene and xylene. The other 36% of the distillate which has not been dealkylated is preferably returned to the tar acid vaporizer for re-processing under similar conditions.

The lower boiling phenolic fractions, particularly the cresols are dealkylated with greater difficulty than are the higher boiling fractions, particularly xylenols and trimethylphenols. For example: a cresol fraction having a boiling point between 195° and 205° C. and having substantially no phenol is processed as hereinbefore described. The product upon analysis consisted of 72% substantially unchanged material, approximately 23 parts phenol, and the remainder a mixture of water, benzene and xylene. Among the other catalysts hereinbefore mentioned, which may be used in a manner analogous to that described in Example 1 for iron oxide is aluminum oxide, which provides approximately 40% conversion of high boiling tar acids into phenol and cresol in the course of a single passage in the catalyst tube with an average time of contact with the catalyst of .57 second. In a manner analogous to that described in Example 2, catalysts may be prepared from nickel sulphide and silica gel, barium oxide and silica gel, mixtures of zinc oxide and vanadium oxide.

The hereinbefore described process may be adapted with modification to selective catalytic hydrogenation of materials in the liquid phase.

In order to accomplish this end it is preferred to charge the high boiling coal tar acids into an autoclave equipped with an agitator, equipping same with properly supported catalysts, admitting hydrogen under pressure, and by means of appropriate devices causing said coal tar material to pass over said catalyst until the proper degree of reaction has been obtained.

Any of the hereinbefore described processes may be made continuous in action by the customary devices by which the product is removed and the unreacted material is caused to repass over the catalytic material.

This application is a division of our copending application Serial Number 163,798, filed September 14, 1937.

Having thus described the subject matter of the present invention, we claim:

1. Process of phenolic dealkylation producing a phenol as the major end product of the reaction which comprises passing a mixture of hydrogen and an alkylated phenol over a catalyst heated to a temperature between 450° C. and 650° C., said catalyst comprising nickel sulphide in sufficient amount to catalyze the dealkylation reaction.

2. Process of phenolic dealkylation producing a phenol as the major end product of the reaction which comprises passing a mixture of hydrogen and an alkylated phenol over a heated catalyst in substantially the volumetric proportion of 4½ parts of hydrogen to 1 part of the phenol vapors, said catalyst comprising nickel sulphide in sufficient amount to catalyze the dealkylation reaction.

3. Process of phenolic dealkylation producing a phenol as the major end product of the reaction which comprises passing a mixture of hydrogen and an alkylated phenol over a heated catalyst, said catalyst comprising nickel sulphide in sufficient amount to catalyze the dealkylation reaction, and correlating the temperature of the catalyst between 450° C. and 650° C. with respect to the boiling point of the phenol, the phenols having the higher boiling points being dealkylated at the lower temperatures.

VIRGIL E. MEHARG.
KENNETH W. COONS.